(12) United States Patent
Wu et al.

(10) Patent No.: US 11,327,961 B2
(45) Date of Patent: May 10, 2022

(54) ACTION QUEUE FOR HIERARCHY MAINTENANCE

(71) Applicant: SAP SE, Walldorf (DE)

(72) Inventors: Zhiqiang Wu, Shanghai (CN); Shichang Li, Shanghai (CN)

(73) Assignee: SAP SE, Walldorf (DE)

( * ) Notice: Subject to any disclaimer, the term of this patent is extended or adjusted under 35 U.S.C. 154(b) by 309 days.

(21) Appl. No.: 16/101,641

(22) Filed: Aug. 13, 2018

(65) Prior Publication Data

US 2018/0349428 A1 Dec. 6, 2018

Related U.S. Application Data

(63) Continuation of application No. 14/834,675, filed on Aug. 25, 2015, now abandoned.

(51) Int. Cl.
*G06F 16/23* (2019.01)
*G06F 16/2453* (2019.01)
*G06F 16/25* (2019.01)
*G06F 16/28* (2019.01)

(52) U.S. Cl.
CPC ...... *G06F 16/2386* (2019.01); *G06F 16/2343* (2019.01); *G06F 16/2379* (2019.01); *G06F 16/2454* (2019.01); *G06F 16/25* (2019.01); *G06F 16/282* (2019.01)

(58) Field of Classification Search
None
See application file for complete search history.

(56) References Cited

U.S. PATENT DOCUMENTS

| 2006/0085444 | A1* | 4/2006 | Sarawgi | G06F 16/2454 |
| 2008/0168025 | A1* | 7/2008 | Kratz | G06F 16/2454 |
| 2009/0228429 | A1* | 9/2009 | Diaconu | G06F 16/188 |
| 2014/0052690 | A1* | 2/2014 | Kamireddy | G06F 16/2386 |
| | | | | 707/624 |
| 2016/0171055 | A1* | 6/2016 | Erickson | G06F 11/30 |
| | | | | 707/723 |

* cited by examiner

*Primary Examiner* — Neveen Abel Jalil
*Assistant Examiner* — John J Morris
(74) *Attorney, Agent, or Firm* — Buckley, Maschoff & Talwalkar LLC

(57) ABSTRACT

A system includes reception of a first instruction at a first system to effect a first change to a hierarchy data model, storage of a first record including first values specifying the first change in a local memory of the first system, reception of a second instruction to effect a second change to the hierarchy data model, storage of a second record including second values specifying the second change in the local memory of the first computer system, reception of an instruction to save the changed hierarchy data model, and, in response to the instruction, transmit the first record and the second record to a second system. The first record and the second record are received and merged to generate a third record including third values specifying a third change to the hierarchy data model, and a query language statement is generated to effect the third change to the hierarchy data model based on the third record.

18 Claims, 13 Drawing Sheets

| Action Type | Node ID | Parent ID | Seq. No. | Old Value | New Value |
|---|---|---|---|---|---|
| NEW_NODE | 4 | 2 | 01 | | {"node_name":"D"} |

| Action Type | Node ID | Parent ID | Seq. No. | Old Value | New Value |
|---|---|---|---|---|---|
| NEW_NODE | 4 | 2 | 01 | | {"node_name":"D"} |
| CHG_FIELDS | 4 | | | | {"node_name":"E"} |

| Action Type | Node ID | Parent ID | Seq. No. | Old Value | New Value |
|---|---|---|---|---|---|
| NEW_NODE | 4 | 2 | 01 | | {"node_name":"D"} |
| CHG_FIELDS | 4 | | | | {"node_name":"E"} |
| CHG_PARENT | 4 | 2 | 01 | | 3 |

← 600

| Action Type | Node ID | Parent ID | Seq. No. | Old Value | New Value |
|---|---|---|---|---|---|
| NEW_NODE | 4 | 2 | 01 | | {"node_name":"D"} |
| CHG_FIELDS | 4 | | | | {"node_name":"E"} |
| CHG_PARENT | 4 | 2 | 01 | | 3 |

| Action Type | Node ID | Parent ID | Seq. No. | Old Value | New Value |
|---|---|---|---|---|---|
| NEW_NODE | 4 | 2 | 01 | | {"node_name":"E"} |
| CHG_PARENT | 4 | 2 | 01 | | 3 |

| Action Type | Node ID | Parent ID | Seq. No. | Old Value | New Value |
|---|---|---|---|---|---|
| NEW_NODE | 4 | 3 | 01 | | {"node_name":"E"} |

*FIG. 14*

| Action Type | Node ID | Parent ID | Seq. No. | Old Value | New Value |
|---|---|---|---|---|---|
| NEW_NODE | 4 | 2 | 01 | | {"node_name":"D"} |
| CHG_FIELDS | 4 | | | | {"node_name":"E"} |
| CHG_PARENT | 4 | 2 | 01 | | 3 |
| DEL_NODE | 4 | | | | |

*FIG. 16*

| Action Type | Node ID | Parent ID | Seq. No. | Old Value | New Value |
|---|---|---|---|---|---|
| NEW_NODE | 4 | 2 | 01 | | {"node_name":"E"} |
| CHG_PARENT | 4 | 2 | 01 | | 3 |
| DEL_NODE | 4 | | | | |

*FIG. 17*

| Action Type | Node ID | Parent ID | Seq. No. | Old Value | New Value |
|---|---|---|---|---|---|
| NEW_NODE | 4 | 3 | 01 | | {"node_name":"E"} |
| DEL_NODE | 4 | | | | |

*FIG. 18*

| Action Type | Node ID | Parent ID | Seq. No. | Old Value | New Value |
|---|---|---|---|---|---|
| | | | | | |

*FIG. 19*

| Action Type | Node ID | Parent ID | Seq. No. | Old Value | New Value |
|---|---|---|---|---|---|
| CHG_NODE | xxx | | | | Key value pairs in JSON format |
| CHG_PARENT | xxx | | xxx | xxx | xxx |
| CHG_EDGE | xxx | xxx | xxx | | |
| NEW_EDGE | xxx | xxx | xxx | | |
| NEW_NODE | xxx | xxx | xxx | | Key value pairs in JSON format |
| DEL_NODE | xxx | | | | |
| DEL_EDGE | xxx | xxx | | | |

*FIG. 20*

ACTION QUEUE FOR HIERARCHY MAINTENANCE

CROSS-REFERENCE TO RELATED APPLICATIONS

The present application claims priority to U.S. patent application Ser. No. 14/834,675, filed Aug. 25, 2015, the contents of which are incorporated by reference herein, in their entirety and for all purposes.

BACKGROUND

Many aspects of business operations involve hierarchies. For example, the relationships between business employees (e.g., reporting and the geographical) are hierarchical. Since these relationships are best represented by hierarchical data structures, a relational database system operated by a business may be required to maintain hierarchical data and support queries thereof.

Relational database systems typically store and query hierarchical data based on data models which describe the hierarchies. These systems may allow a user (e.g., a database administrator) to effect changes to a data model using a front-end graphical interface. In response to each change, the changed data model is transmitted to a back-end data model layer and buffered therein. Eventually, upon user selection of a Save function, the last-buffered data model is written to the back-end database.

Transmission of a complete hierarchical data model in response to each user-initiated change is bandwidth and resource-intensive. Moreover, some conventional systems provide stateless communication between a front-end and a back-end and are therefore unable to support data buffering as described above.

BRIEF DESCRIPTION OF THE DRAWINGS

FIGS. 12 through 14 comprise tabular representations of portions of an action queue table according to some embodiments.

FIGS. 16 through 19 comprise tabular representations of portions of an action queue table according to some embodiments.

FIG. 20 is a tabular representation of examples of action queue table entries according to some embodiments.

DETAILED DESCRIPTION

The following description is provided to enable any person in the art to make and use the described embodiments. Various modifications, however, will remain readily apparent to those in the art.

Figure 1:
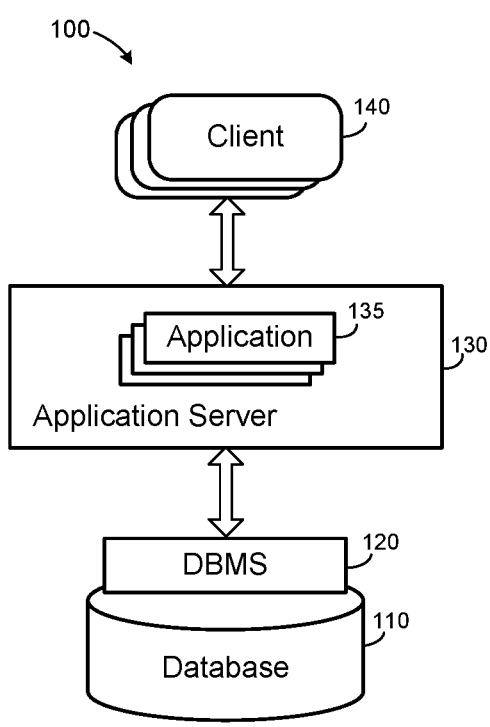
FIG. 1 is a block diagram of a database architecture according to some embodiments.

FIG. 1 is a block diagram of database architecture 100 according to some embodiments. Embodiments are not limited to architecture 100 or to a database architecture.

Architecture 100 includes database 110, database management system (DBMS) 120, application server 130, applications 135 and clients 140. Generally, applications 135 executing within application server 130 receive queries from clients 140 and provides results to clients 140 based on data of database 110. Applications 135 executing within application server 130 may also provide administrative functions to clients 140, including but not limited to data model editing as will be described below.

Application server 130 executes and provides services to applications 135. Applications 135 may comprise server-side executable program code (e.g., compiled code, scripts, etc.) which provide functionality to clients 140 by providing user interfaces to clients 140, receiving requests from clients 140, retrieving data from database 110 based on the requests, processing the data received from database 110, and providing the processed data to clients 140. Applications 135 may be made available for execution by application server 130 via registration and/or other procedures which are known in the art.

Application server 130 provides any suitable interfaces through which clients 140 may communicate with applications 135 executing on application server 130. For example, application server 130 may include a HyperText Transfer Protocol (HTTP) interface supporting a transient request/response protocol over Transmission Control Protocol (TCP), a WebSocket interface supporting non-transient full-duplex communications between application server 130 and any clients 140 which implement the WebSocket protocol over a single TCP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 235 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from or closely integrated with DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) using which applications 135 may manage and query the data of database 110. The application services can be used to expose the database data model, with its tables, hierarchies, views and database procedures, to clients. In addition to exposing the data model, application server 130 may host system services such as a search service.

Database 110 may store metadata regarding the structure, relationships and meaning of the data stored within database 110. This information may include data defining the schema of database tables stored within database 110. A database table schema may specify the name of the database table, columns of the database table, the data type associated with each column, and other information associated with the database table.

Database 110 includes, among other data, hierarchical data. Hierarchical data may include any type of hierarchical data that is or becomes known, not limited to the employee-related data mentioned above. Both the content of each node of hierarchical data and the structure of the hierarchies defined by hierarchical data may change from time to time. Some hierarchical data may be versioned, in that one or more past versions of a hierarchy are persisted in database 110.

Hierarchical data may be stored in relational tables, in which each row of a "hierarchical" table corresponds to a node in a hierarchy. According to some embodiments, the schema of each hierarchical table includes columns which specify, for each row (node) of the table, a lower bound, an upper bound, and a level.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of a software application for presenting user interfaces to allow interaction with application server 130. The user interfaces may comprise user interfaces suited for reporting, data analysis, data modelling, and/or any other functions based on the data of database 110.

Presentation of a user interface as described herein may comprise any degree or type of rendering, depending on the type of user interface code generated by application server 130. For example, a client 140 may execute a Web Browser to request and receive a Web page (e.g., in HTML format) from application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine.

Figure 2:
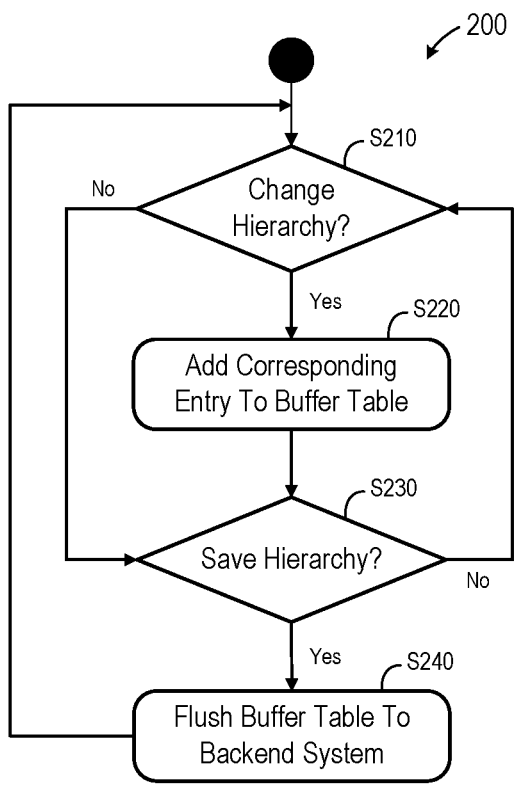
FIG. 2 is a flow diagram of a process according to some embodiments.

FIG. 2 comprises a flow diagram of process 200 according to some embodiments. Process 200 may facilitate the editing of hierarchical data models according to some embodiments.

In some embodiments, various hardware elements of architecture 100 (e.g., one or more processors) execute program code to perform process 200. Process 200 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
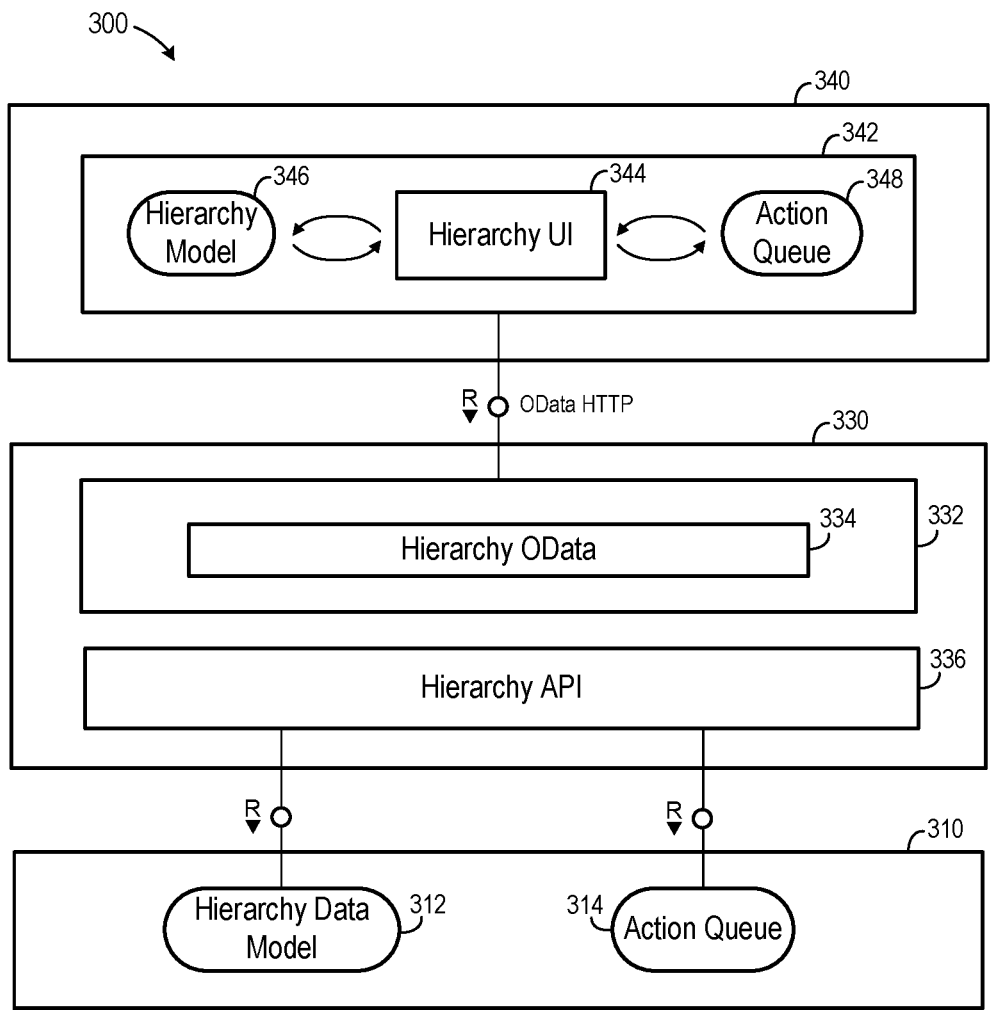
FIG. 3 is a block diagram of a runtime system according to some embodiments.

Initially, at S210, it is determined whether a user has changed a hierarchy data model. FIG. 3 is a block diagram of architecture 300 to be used in the following description of one example of process 200. Architecture 300 may comprise elements of an implementation of architecture 100. For example, database 310 may comprise an implementation of DBMS 120 and database 110, application suite 330 may comprise an implementation of application server 130 and browser 340 may comprise an implementation of a client 340.

As shown, browser 340 executes hierarchy editor application 342. Hierarchy editor application 342 includes hierarchy UI 344, which may consist of one or more graphical user interfaces to view, edit and save a hierarchy data model according to some embodiments. Hierarchy UI 344 may present hierarchy data models from hierarchy model store 346 and store hierarchy data models thereto.

Figure 4:
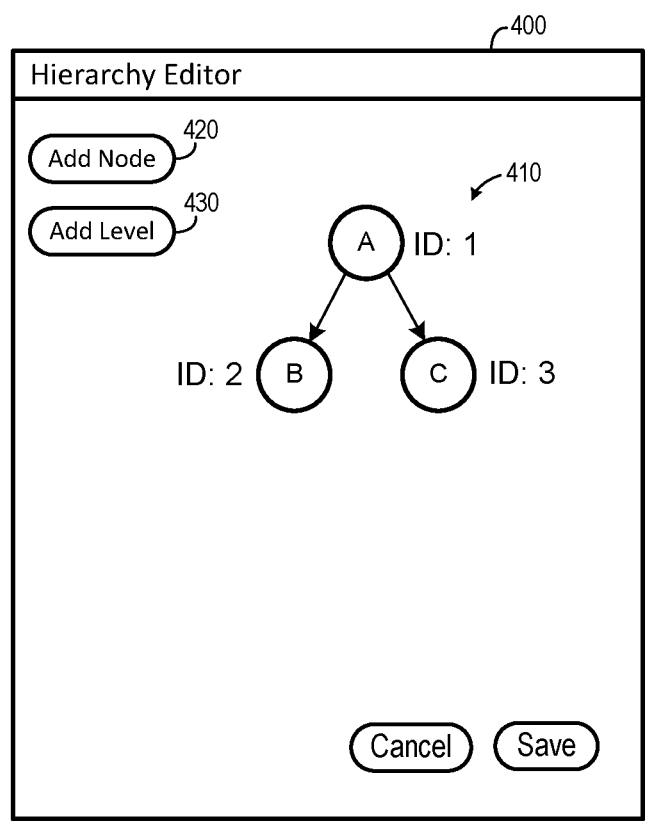
FIG. 4 is an outward view of a user interface to modify a hierarchy according to some embodiments.

FIG. 4 is an outward view of interface 400 of hierarchy UI 344 according to some embodiments. Interface 400 may be presented on any type of display apparatus (e.g., desktop monitor, smartphone display, tablet display) provided by any type of client device (e.g., desktop system, smartphone, tablet computer). Interface 400 presents a graphical representation of hierarchy data model 410, which includes two levels and three nodes. Model 410 and its constituent nodes A, B and C may represent any hierarchical data. Interface 400 includes controls 420 and 430 for adding a node and a level, respectively.

Figures 5, 6:
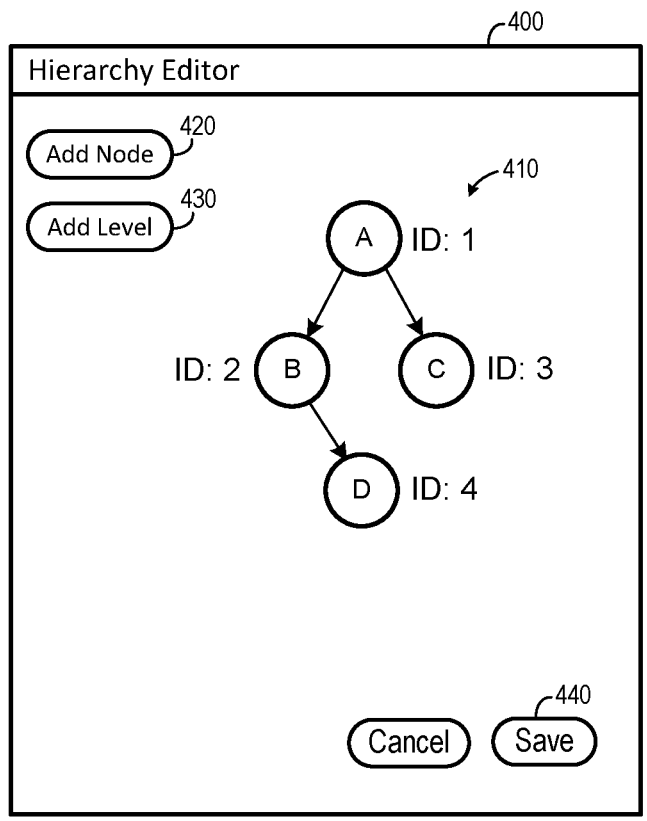
FIG. 5 is an outward view of a user interface to modify a hierarchy according to some embodiments.
FIG. 6 is a tabular representation of an action queue table according to some embodiments.

Returning to process 200, flow cycles between S210 and S230 until a user changes hierarchy model 410 or instructs application 342 to save hierarchy model 410. For purposes of the present example, it will be assumed that the user manipulates interface controls 420 and 430 to add a level and a node to hierarchy model 410 as shown in FIG. 5. Any suitable UI paradigm may be used to manipulate and edit model 410 according to some embodiments.

In response to the change, and as illustrated in FIG. 2, a corresponding entry is added to a local buffer table at S220. Action queue 348 of FIG. 3 may implement such a local buffer table according to some embodiments. FIG. 6 is a tabular representation of buffer table 600 including the entry added at S220 according to the present example. Embodiments are not limited to the schema of table 600.

The entry of table 600 specifies an Action Type related to the change (i.e., NEW_NODE: add a new node), a node ID corresponding to the Action Type (i.e., the ID of the added node), a Parent ID corresponding to the Action Type (i.e., the ID of the parent node of the added node), a Sequence Number (i.e., the horizontal position of the node under its parent node), an Old Value (inapplicable for the Action Type NEW_NODE), and a New Value (i.e., the name of the new node).

Figures 7, 8:
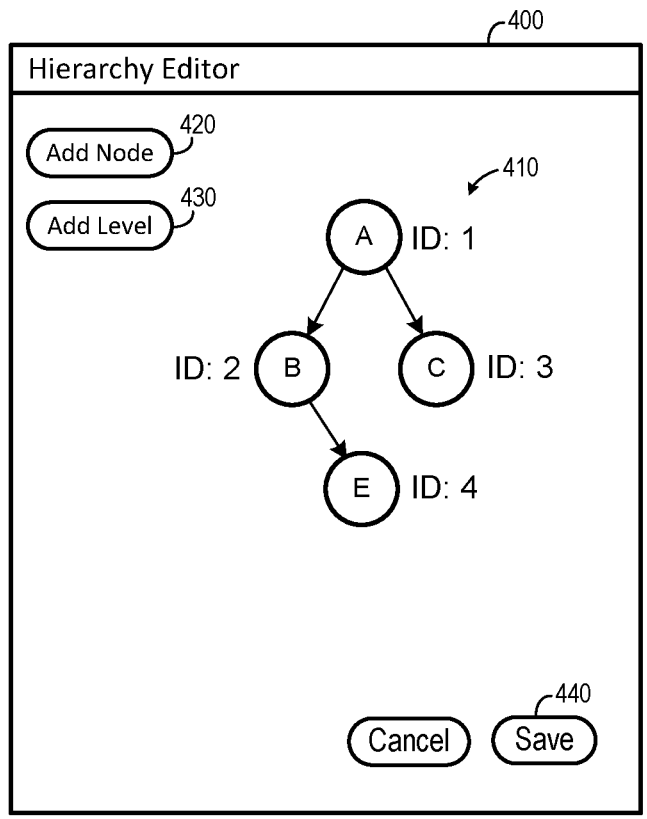
FIG. 7 is an outward view of a user interface to modify a hierarchy according to some embodiments.
FIG. 8 is a tabular representation of an action queue table according to some embodiments.

Flow continues to S230 to determine whether the user has issued a command to save the hierarchy. If not, as it will be assumed in the present example, flow returns to S220 to cycle as before. Continuing the example, FIG. 7 illustrates changing of the name of the previously-added node from "D" to "E". As described, any suitable UI paradigm may be used to change the name of the node and graphically illustrate the change within data model 410.

A corresponding entry is added to the buffer table at S220. FIG. 8 illustrates the added entry, specifying an Action Type related to the change (i.e., CHG_FIELDS: change a field associated with the data model), a node ID corresponding to the Action Type (i.e., the ID of the node including the changed field), a Parent ID corresponding to the Action Type (i.e., inapplicable/unneeded for the Action Type CHG_FIELDS), a Sequence Number (i.e., inapplicable/unneeded for the Action Type CHG_FIELDS) an Old Value (inapplicable/unneeded for the Action Type CHG_FIELDS), and a New Value (i.e., the name of the field and the new value).

Figures 9, 10:
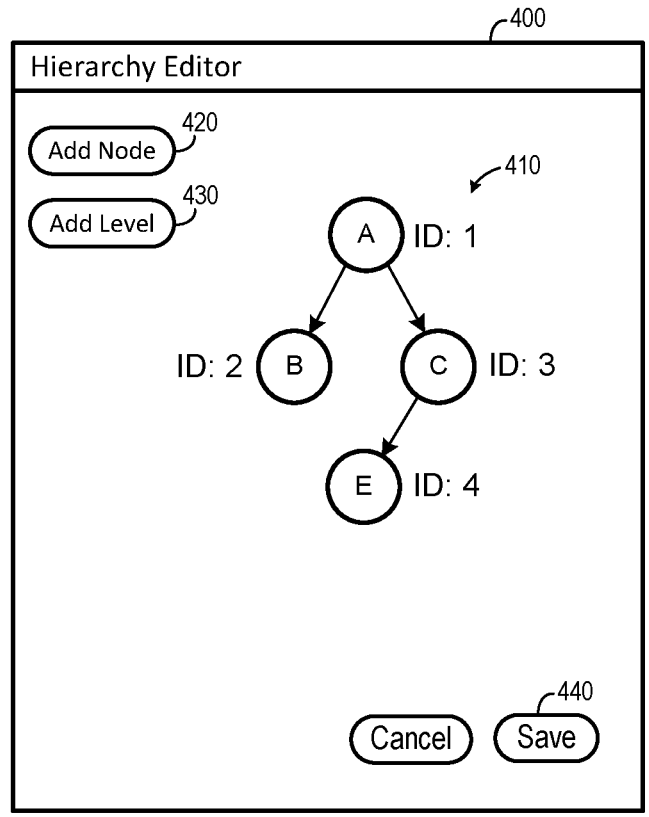
FIG. 9 is an outward view of a user interface to modify a hierarchy according to some embodiments.
FIG. 10 is a tabular representation of an action queue table according to some embodiments.

It will be assumed that the user continues to change data model 410, as now illustrated in FIG. 9. Specifically, the user has issued an instruction to change the parent of node E from node B to node C. Accordingly, the determination at S210 is affirmative and an entry corresponding to the change is added to the buffer table at S220. The added entry according to some embodiments is shown in FIG. 10.

The added entry of FIG. 10 specifies an Action Type (i.e., CHG_PARENT: change a parent associated with a node), a node ID corresponding to the Action Type (i.e., the ID of the node whose parent has changed), a Parent ID corresponding to the Action Type (i.e., the ID of the parent node of the node whose parent has changed), a Sequence Number (i.e., the horizontal position of the node under its parent node), an Old Value (not required for the Action Type CHG_PARENT, but value of prior parent ID could be used), and a New Value (i.e., the node ID of the new parent node).

It will now be assumed that the user selects Save control 440 of interface 400. Flow therefore proceeds to S240 to flush the buffer table to a back-end system. Notably, according to some embodiments, no changes are communicated to the back-end system during the repeated execution of S210, S220 and S230. With reference to system 100, a client 140 transmits buffer table 600 to application server 130 at S240. In a more specific example of S240 according to some embodiments, application 342 of system 300 transmits action queue 348 to OData gateway 332 of application suite 330 via the OData protocol.

Figure 11:
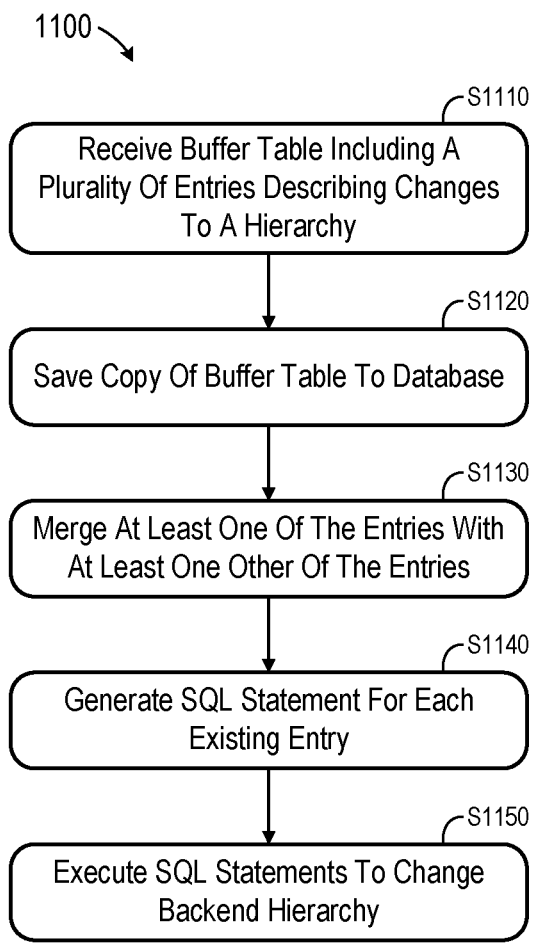
FIG. 11 is a flow diagram of a process according to some embodiments.

Process 1100 of FIG. 11 may be executed by a backend system to change a stored hierarchy data model based on the received buffer table according to some embodiments. Process 1100 may be executed by application server 130 or by hierarchy API 336 of the present examples, but embodiments are not limited thereto.

A buffer table is received at S1110. As described above, the buffer table includes a plurality of entries describing changes to a hierarchical data model. At S1120, a copy of the buffer table is saved to a database. FIG. 3 illustrates action queues 314 saved within database 310 according to some embodiments. A full copy of the received buffer table may be saved at S1120 for compliance, archival or other purposes.

At least one of the entries is merged with at least one other of the entries at S1130. Merging the entries reduces the number of database commands which must be executed against the stored hierarchy data model in order to conform the hierarchy data model to the user changes. For example, if one entry specifies a change of an attribute from x to y and another entry specifies a change of the attribute from y to z, these entries may be merged into one entry specifying a change in the attribute from x to z. In another example, if one entry specifies creation of a node and another entry specifies deletion of the node, the two entries may be merged and deleted.

FIGS. 12-14 illustrate entry mergers at S1130 according to some embodiments. FIG. 12 shows table 600 of FIG. 10. The first and second entries specify actions NEW_NODE and CHG_FIELDS on node ID 4. Accordingly, the entries may be merged into a single NEW_NODE entry as shown in FIG. 13, specifying a node name of "E".

The remaining entries specify actions NEW_NODE and CHG_PARENT on node ID 4. These entries may be merged into one entry as shown in FIG. 14. The new NEW_NODE entry specifying a parent node ID of "3".

After merging of the entries, a Structured Query Language (SQL) statement is generated for each existing entry at S1140. Referring to table 600 of FIG. 14, the following SQL statement may be generated at S1140:
INSERT INTO Hierarchy (NodeID, NodeName, Seq Nr, ParentNode) VALUES ('4', 'E', '01', '3')

Next, at S1150, the SQL statement(s) generated at S1140 are executed against the database to change the hierarchy data model stored in the back-end (e.g., hierarchy data model 312).

Figure 15:
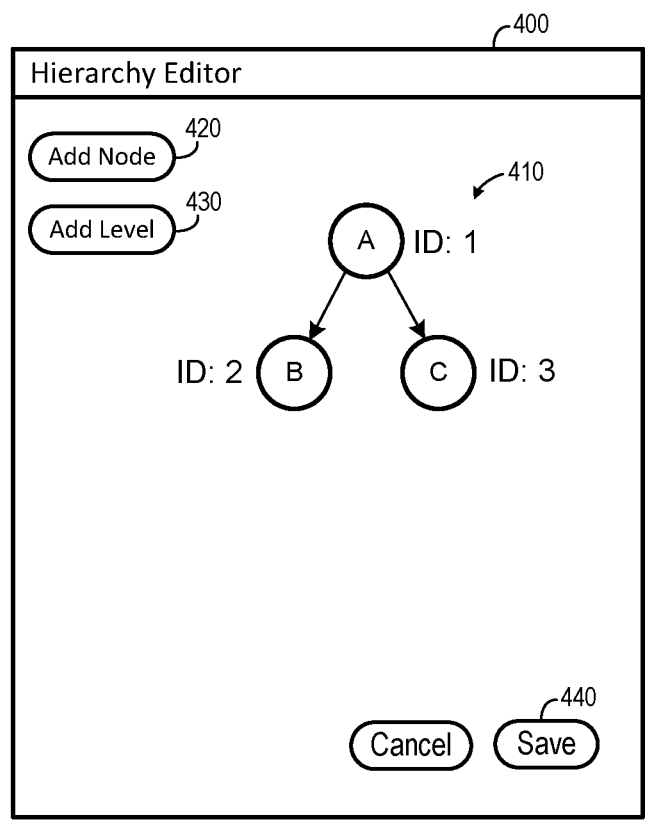
FIG. 15 is a flow diagram of a process according to some embodiments.

Another example of S1130 and S1140 will now be provided. It will be assumed that a user does not select save control 440 after changing hierarchy data model 410 as shown in FIG. 9. Rather, as shown in FIG. 15, node E is deleted. The deletion results in the addition of a corresponding entry in local buffer table 600, as shown in FIG. 16. The entry specifies an Action Type (i.e., DEL_NODE: delete a node), a node ID corresponding to the Action Type (i.e., the ID of the deleted node), a Parent ID corresponding to the Action Type (not required for Action Type DEL_NODE), a Sequence Number (not required for Action Type DEL_NODE) an Old Value (not required for Action Type DEL_NODE), and a New Value (not required for Action Type DEL_NODE).

Assuming that table 600 of FIG. 16 is received at S1110 and copied at S1120, the first and second entries are merged at S1130 as described above to result in table 600 of FIG. 17. Similarly, the first and second entries of table 600 of FIG. 17 are merged as described above to result in table 600 of FIG. 18. Finally, because the remaining two entries call from creation of a node and for deletion of the same node, the entries are "merged" into an empty entry. That is, no changes are to be made to hierarchy data model 312. Accordingly, no SQL statements are generated at S1140 and no SQL statements are executed to change hierarchy data model 312 at S1150.

FIG. 20 illustrates action queue entries for various Action Types according to some embodiments. The term "Edge" refers to a connection between two nodes. The flag "xxx" indicates whether a field is used for the particular Action Type. According to some embodiments, only the Node ID column is used for every Action Type.

Figure 21:
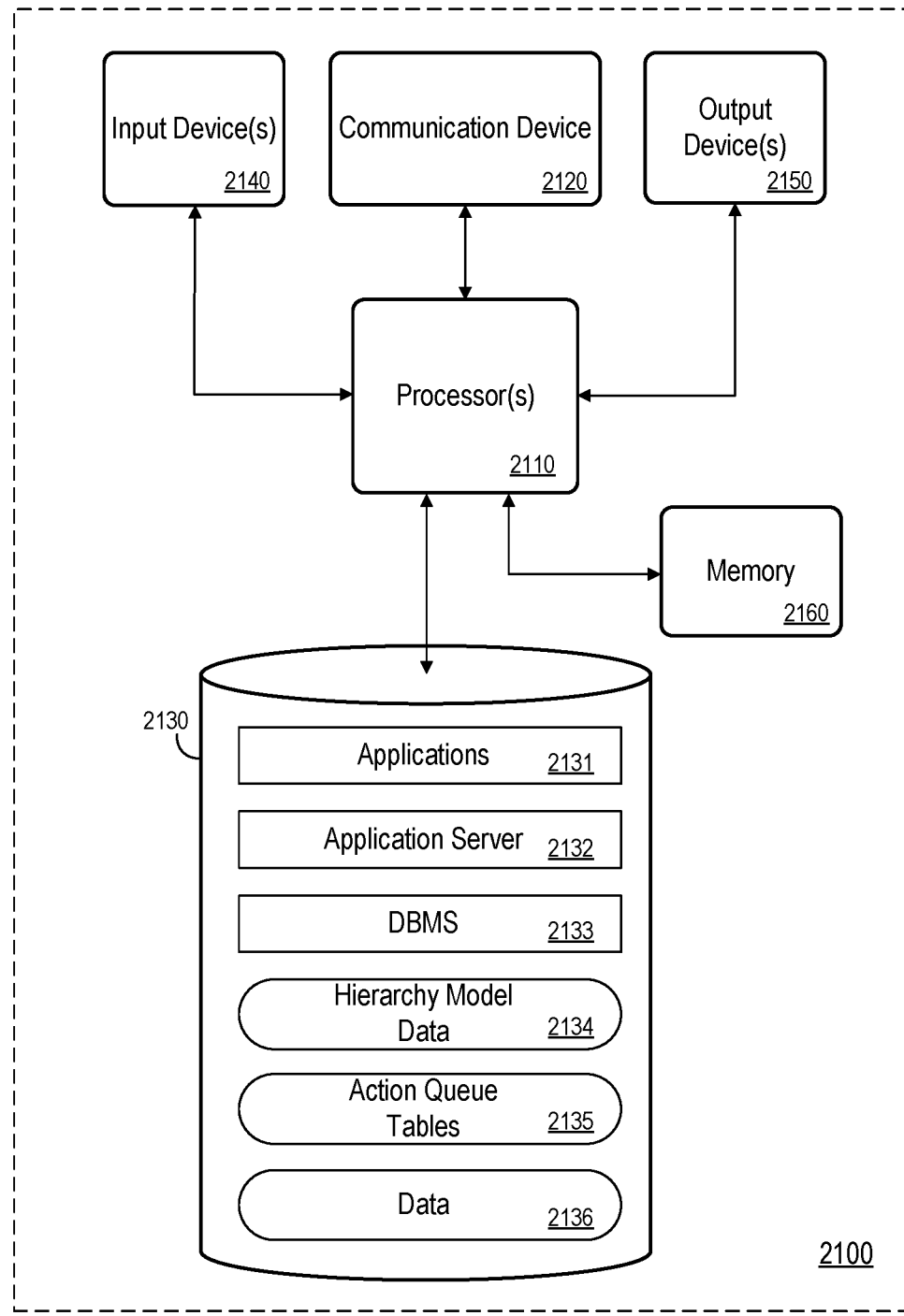
FIG. 21 is a block diagram of an apparatus according to some embodiments.

FIG. 21 is a block diagram of apparatus 2100 according to some embodiments. Apparatus 2100 may comprise a general-purpose computing apparatus and may execute program code to perform any of the functions described herein. According to some embodiments, apparatus 2100 may comprise an implementation of application server 130, DBMS 120 and database 110 of FIG. 1 and/or of application suite 330 and database 310 of FIG. 3 in some embodiments. Apparatus 2100 may include other unshown elements.

Apparatus 2100 includes processor 2110 operatively coupled to communication device 2120, data storage device 2130, one or more input devices 2140, one or more output devices 2150 and memory 2160. Communication device 2120 may facilitate communication with external devices, such as a client, or an external data storage device. Input device(s) 2140 may comprise, for example, a keyboard, a keypad, a mouse or other pointing device, a microphone, knob or a switch, an infra-red (IR) port, a docking station, and/or a touch screen. Input device(s) 2140 may be used, for example, to enter information into apparatus 2100. Output device(s) 2150 may comprise, for example, a display (e.g., a display screen) a speaker, and/or a printer.

Data storage device 2130 may comprise any appropriate persistent storage device, including combinations of magnetic storage devices (e.g., magnetic tape, hard disk drives and flash memory), optical storage devices, Read Only Memory (ROM) devices, etc., while memory 2160 may comprise Random Access Memory (RAM), Storage Class Memory (SCM) or any other fast-access memory.

Applications 2131, application server 2132 and DBMS 2133 may comprise program code executed by processor 2110 to cause apparatus 2100 to perform any one or more of the processes described herein. Embodiments are not limited to execution of these processes by a single apparatus.

Hierarchy model data 2134, action queue tables 2135 and data 2136 (either cached or a full database) may be stored in device 2130 as shown and/or in volatile memory such as memory 2160. Data storage device 2130 may also store data and other program code for providing additional functionality and/or which are necessary for operation of apparatus 2100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:
1. A system comprising:
a first system comprising:
 a first memory storing first processor-executable process steps; and
 a first processor to execute the first processor-executable process steps to cause the first system to:
  receive a first indication to effect a first change to a hierarchy data model, the hierarchy data model describing hierarchical data stored by a database;
  store, prior to executing first instructions to effectuate the first change, a first record including first values specifying the first change in a local memory of the first system
  receive a second indication to effect a second change to the hierarchy data model;
  store, prior to executing second instructions to effectuate the second change, a second record including second values specifying the second change in the local memory of the first system;
  receive a save instruction to save the changed hierarchy data model; and
  in response to the save instruction, transmit the first record and the second record to a second system;
the second system comprising:
 a second memory storing second processor-executable process steps; and
 a second processor to execute the second processor-executable process steps to cause the second system to:
  receive the first record and the second record;
  merge the first record and the second record to generate a third record including third values specifying a third change to the hierarchy data model, the third values specifying a change to conform the hierarchy data model to a result of the first change and the second change, with a reduced number of database commands, for the hierarchical data stored by the database
  remove the first values from the first record;
  remove the second values from the second record;
  generate, in response to the generation of the third record, a query language statement based on the third record; and
  execute the query language statement to effect the third change to the hierarchy data model using the reduced number of database commands.

2. The system according to claim 1, the first processor to execute the first processor-executable process steps to cause the first system to:
  receive a third indication to effect a fourth change to the hierarchy data model; and
  store a fourth record including fourth values specifying the fourth change in the local memory of the first system,
  wherein merge of the first record and the second record to generate the third record comprises merge of the first record, the second record and the fourth record to generate the third record.

3. The system according to claim 1, the first processor to execute the first processor-executable process steps to cause the first system to:
  receive a third indication to effect a fourth change to the hierarchy data model;
  store a fourth record including fourth values specifying the fourth change in the local memory of the first system,
  in response to the save instruction, transmit the fourth record to the second system;
  the second processor to execute the second processor-executable process steps to cause the second system to:
  receive the fourth record; and
  generate a second query language statement to effect the fourth change to the hierarchy data model based on the fourth record.

4. The system according to claim 1, wherein the first processor is to execute the first processor-executable process steps to cause the first system to:
  receive a third indication to effect a fourth change to the hierarchy data model;
  store a fourth record including fourth values specifying the fourth change in the local memory of the first system;
  receive a fourth indication to effect a fifth change to the hierarchy data model;
  store a fifth record including fifth values specifying the fifth change in the local memory of the first system;
  receive the save instruction to save the changed hierarchy data model; and
  in response to the save instruction, transmit the fourth record and the fifth record to the second system; and
  the second processor to execute the second processor-executable process steps to cause the second system to:
  receive the fourth record and the fifth record;
  merge the fourth record and the fifth record to generate a sixth record including sixth values specifying a sixth change to the hierarchy data model; and
  generate a second query language statement to effect the sixth change to the hierarchy data model based on the sixth record.

5. The system according to claim 1, wherein the first record and the second record are not transmitted to the second system before the save instruction is received by the first system.

6. The system according to claim 5, wherein the first record and the second record are transmitted and received via Open Data Protocol.

7. A computer-implemented method comprising:
  receiving a first indication at a first system to effect a first change to a hierarchy data model, the hierarchy data model describing hierarchical data stored by a database;
  storing, prior to executing first instructions to effectuate the first change, a first record including first values specifying the first change in a local memory of the first system;
  receiving a second indication at the first system to effect a second change to the hierarchy data model;
  storing, prior to executing second instructions to effectuate the first change, a second record including second values specifying the second change in the local memory of the first system;
  receiving a save instruction to save the changed hierarchy data model;
  in response to the save instruction, transmitting the first record and the second record to a second system;
  receiving the first record and the second record;
  merging the first record and the second record to generate a third record including third values specifying a third change to the hierarchy data model, the third values specifying a change to conform the hierarchy data model to a result of the first change and the second change, with a reduced number of database commands, for the hierarchical data stored by the database;
  removing the first values from the first record;
  removing the second values from the second record;
  generating, in response to the generation of the third record, a query language statement based on the third record; and
  executing the query language statement to effect the third change to the hierarchy data model using the reduced number of database commands.

8. The method according to claim 7, further comprising:
  receiving a third indication to effect a fourth change to the hierarchy data model; and
  storing a fourth record including fourth values specifying the fourth change in the local memory of the first device,
  wherein merging the first record and the second record to generate the third record comprises merging of the first record, the second record and the fourth record to generate the third record.

9. The method according to claim 7, further comprising:
  receiving a third indication at the first system to effect a fourth change to the hierarchy data model;
  storing a fourth record including fourth values specifying the fourth change in the local memory of the first system,
  in response to the save instruction, transmitting the fourth record to the second system;
  receiving the fourth record at the second system; and
  generating a second query language statement to effect the fourth change to the hierarchy data model based on the fourth record.

10. The method according to claim 7, further comprising
  receiving a third indication at the first system to effect a fourth change to the hierarchy data model;
  storing a fourth record including fourth values specifying the fourth change in the local memory of the first system;
  receiving a fourth indication at the first system to effect a fifth change to the hierarchy data model;
  storing a fifth record including fifth values specifying the fifth change in the local memory of the first device;
  receiving at the first system the save instruction to save the changed hierarchy data model;
  in response to the save instruction, transmitting the fourth record and the fifth record to the second system;

receiving the fourth record and the fifth record at the second system;

merging the fourth record and the fifth record to generate a sixth record including sixth values specifying a sixth change to the hierarchy data model; and generating a second query language statement to effect the sixth change to the hierarchy data model based on the sixth record.

11. The method according to claim 7, wherein the first record and the second record are not transmitted to the second system before the save instruction is received by the first system.

12. The method according to claim 11, wherein the first record and the second record are transmitted and received via Open Data Protocol.

13. A non-transitory computer-readable medium storing program code, the program code executable by a first computer system to cause the first computer system to:

receive a first indication to effect a first change to a hierarchy data model, the hierarchy data model describing hierarchical data stored by a database;

store, prior to executing first instructions to effectuate the first change, a first record including first values specifying the first change in a local memory of the first computer system;

receive a second indication to effect a second change to the hierarchy data model;

store, prior to executing second instructions to effectuate the first change, a second record including second values specifying the second change in the local memory of the first computer system;

receive a save instruction to save the changed hierarchy data model;

in response to the save instruction, transmit the first record and the second record to a second computer system, the program code executable by the second computer system to cause the second computer system to:

receive the first record and the second record;

merge the first record and the second record to generate a third record including third values specifying a third change to the hierarchy data model, the third values specifying a change to conform the hierarchy data model to a result of the first change and the second change, with a reduced number of database commands, for the hierarchical data stored by the database;

remove the first values from the first record;

remove the second values from the second record; and generate, in response to the generation of the third record, a query language statement based on the third record; and execute the query language statement to effect the third change to the hierarchy data model using the reduced number of database commands.

14. The medium according to claim 13, the program code executable by the first computer system to cause the first computer system to:

receive a third indication to effect a fourth change to the hierarchy data model; and store a fourth record including fourth values specifying the fourth change in the local memory of the first computer system, wherein merge of the first record and the second record to generate the third record comprises merge of the first record, the second record and the fourth record to generate the third record.

15. The medium according to claim 13, the program code executable by the first computer system to cause the first computer system to:

receive a third indication to effect a fourth change to the hierarchy data model;

store a fourth record including fourth values specifying the fourth change in the local memory of the first computer system; and in response to the save instruction, transmitting the fourth record to the second computer system, and the program code executable by the second computer system to cause the second computer system to:

receive the fourth record; and generate a second query language statement to effect the fourth change to the hierarchy data model based on the fourth record.

16. The medium according to claim 13, the program code executable by the first computer system to cause the first computer system to:

receive a third indication at the first system to effect a fourth change to the hierarchy data model;

store a fourth record including fourth values specifying the fourth change in the local memory of the first computer system;

receive a fourth indication at the first system to effect a fifth change to the hierarchy data model;

store a fifth record including fifth values specifying the fifth change in the local memory of the first computer system;

in response to the save instruction, transmit the fourth record and the fifth record to the second computer system, the program code executable by the second computer system to cause the second computer system to:

receive the fourth record and the fifth record;

merge the fourth record and the fifth record to generate a sixth record including sixth values specifying a sixth change to the hierarchy data model; and generate a second query language statement to effect the sixth change to the hierarchy data model based on the sixth record.

17. The medium according to claim 13, wherein the first record and the second record are not transmitted to the second computer system before the save instruction is received by the first computer system.

18. The medium according to claim 17, wherein the first record and the second record are transmitted and received via Open Data Protocol.

* * * * *